(12) United States Patent
Shapiro et al.

(10) Patent No.: US 6,574,588 B1
(45) Date of Patent: Jun. 3, 2003

(54) SOLID-STATE MEMORY DEVICE THAT EMULATES A KNOWN STORAGE DEVICE

(75) Inventors: Daniel Shapiro, Redmond, WA (US); Raymond D. Pedrizetti, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/159,522

(22) Filed: Sep. 23, 1998

(51) Int. Cl.$^7$ .................. G06F 9/455; G06F 13/00; G06F 9/00; G06F 3/00; G06F 13/12
(52) U.S. Cl. .................. 703/24; 703/25; 709/321; 709/325; 709/326; 709/327; 710/8; 710/10; 710/13; 710/14; 710/63; 710/72; 710/73; 710/74
(58) Field of Search .................. 703/23, 24, 25; 710/8, 9, 10, 11, 12, 13, 14, 72, 73, 74; 709/321, 325, 326, 327

(56) References Cited

U.S. PATENT DOCUMENTS

| 4,787,026 A | * | 11/1988 | Barnes et al. ............. 711/6 |
| 4,984,149 A | * | 1/1991 | Iwashita et al. ............ 711/4 |
| 5,131,089 A | * | 7/1992 | Cole .................. 703/24 |
| 5,291,584 A | * | 3/1994 | Challa et al. ............. 703/24 |
| 5,371,885 A | * | 12/1994 | Letwin ................ 707/205 |
| 5,446,855 A | * | 8/1995 | Dang et al. ............. 711/1 |
| 5,454,098 A | * | 9/1995 | Pisello et al. ............ 703/24 |
| 5,457,784 A | * | 10/1995 | Wells et al. ............. 703/24 |
| 5,459,850 A | * | 10/1995 | Clay et al. ............. 703/24 |
| 5,465,364 A | * | 11/1995 | Lathrop et al. ............ 703/20 |
| 5,473,765 A | * | 12/1995 | Gibbons et al. ............ 703/24 |
| 5,491,816 A | * | 2/1996 | Bondy et al. ............. 709/323 |
| 5,499,378 A | * | 3/1996 | McNeill, Jr. et al. |
| 5,546,585 A | * | 8/1996 | Soga .................. 710/16 |
| 5,548,783 A | * | 8/1996 | Jones et al. ............. 710/16 |
| 5,694,583 A | * | 12/1997 | Williams et al. ........... 703/24 |
| 5,717,903 A | * | 2/1998 | Bonola ................ 703/24 |
| 5,751,975 A | * | 5/1998 | Gillespie et al. ........... 710/126 |
| 5,784,581 A | * | 7/1998 | Hannah ................ 710/110 |
| 5,890,014 A | * | 3/1999 | Long .................. 710/8 |
| 5,909,559 A | * | 6/1999 | So .................. 710/127 |
| 5,915,106 A | * | 6/1999 | Ard .................. 703/23 |
| 5,946,469 A | * | 8/1999 | Chidester .............. 345/157 |
| 5,953,516 A | * | 9/1999 | Bonola ................ 703/22 |
| 5,958,020 A | * | 9/1999 | Evoy et al. ............. 710/3 |
| 5,991,777 A | * | 11/1999 | Momoh et al. ............ 707/205 |
| 6,006,029 A | * | 12/1999 | Bianchi et al. ............ 703/21 |
| 6,009,480 A | * | 12/1999 | Pleso ................. 710/8 |
| 6,012,103 A | * | 1/2000 | Sartore et al. ............ 710/8 |
| 6,064,566 A | * | 5/2000 | Agata et al. ............. 361/685 |
| 6,073,188 A | * | 6/2000 | Fleming ............... 710/38 |
| 6,073,205 A | * | 6/2000 | Thomson ............... 711/100 |
| 6,223,267 B1 | * | 4/2001 | Hodges et al. ............ 707/205 |

OTHER PUBLICATIONS

Anthony Ralston et al., "Encyclopedia of Computer Science, Third Edition", 1993, 9 pages.
Texas Instruments, Inc., "Serial ROM Data Format for IEEE 1394, Open HCI Implementations, Application Report," *IEEE 1394 Configuration ROM*, Texas Instruments, Inc., 1998, pp. 1–10.

* cited by examiner

Primary Examiner—Todd Ingberg
Assistant Examiner—W. Thomson
(74) Attorney, Agent, or Firm—Banner & Witcoff, Ltd.

(57) ABSTRACT

The present invention is directed to a peripheral device that integrally provides a program relating to the peripheral device, and may be connected to a computer system. The peripheral device includes a peripheral function subsystem for providing a peripheral device functionality. The peripheral device further includes a solid-state memory device storing a program relating to the peripheral device in a format used by disk drives. When the peripheral device is connected to a computer system, the program stored in the solid-state memory device is immediately available, and can be read by the computer system as though it was stored on a disk drive connected to the computer system.

25 Claims, 4 Drawing Sheets

SOLID-STATE MEMORY DEVICE THAT EMULATES A KNOWN STORAGE DEVICE

TECHNICAL FIELD

The present invention is directed to the field of computer peripherals, and more particularly, to the field of storage devices.

BACKGROUND OF THE INVENTION

A peripheral device ("peripheral") is a device that is connected to and controlled by a computer system. Peripherals include such devices as a disk drive, printer, modem, optical scanner, or joystick. Peripherals may be connected to a computer system via various types of connections, including a PCI bus, a parallel connection, or a serial connection. Modern serial connections include Universal Serial Bus ("USB") and 1394 connections. Modem serial connections generally permit several peripheral devices to be attached to a computer system via the same serial connection. For instance, a printer, a scanner, and a joystick could all be connected to a computer system via a single USB connection.

Computer systems generally include a program called an operating system that, among other things, manages communications between the computer system and its peripherals. In order to communicate with a particular peripheral, an operating system generally requires an additional computer program called a "driver." The driver for a particular peripheral generally knows the capabilities of the peripheral and the command set for the peripheral. While modem operating systems generally include drivers for common devices, such as hard disk drives, there are many peripherals for which operating systems do not include drivers. In particular, operating systems seldom provide drivers for peripherals that were not available when the operating system was released. In order to use such a peripheral in conjunction with a computer system, the operating system on that computer system must install a driver for the peripheral. Providing such a driver can be a significant inconvenience for the user attempting to use the peripheral. For example, the user may be required to locate a floppy disk or CD that contains the driver, or to download the driver from the Internet. Based on the foregoing, a new peripheral that did not require the provision of a separate driver would have significant utility.

In addition to their drivers, some peripherals also operate in conjunction with other programs. For example, optical scanners often operate in conjunction with an application program for creating in the computer system digital representations of documents that are scanned by the scanner. Similarly, sequential access tape drives often operate in conjunction with file backup utilities that copy the contents of a hard disk drive to a sequential tape cartridge. A new peripheral that did not require the separate provision of these additional programs would also have significant utility.

Entertainment, or "game" software titles are available for many general-purpose computer systems. Such entertainment titles are usually distributed on CD-ROM. While some entertainment titles are small and can be completely loaded into memory from CD-ROM quickly, modem entertainment titles continue to grow larger and larger, containing large quantities of executable program code, as well as large quantities of data, such as digitized sounds, images, and video clips. Because of the relatively low data transfer rate of CD-ROM drives, these modem entertainment titles appear to load and execute slowly, which often produces significant user dissatisfaction. Based on the foregoing, a new, faster medium for distributing entertainment titles for general-purpose computer systems would have significant utility.

Further, entertainment titles and other software titles frequently contain some portions that must be loaded from the medium quickly, and other portions that may be loaded from the media more slowly. For example, an entertainment title may have executable code that must be loaded quickly, as well as a video sequence that may be loaded more slowly as the video sequence plays. Unfortunately, because software titles are typically shipped on media of a single type, developers must choose either to ship the entire software title on a medium having a low transfer rate and create user dissatisfaction during the loading of the portions that must be loaded from the medium quickly, or to ship the entire software title on a medium having a high transfer rate and drive up the cost of manufacturing the software product. Based on foregoing, a new, speed heterogeneous medium for distributing software titles would have significant utility.

SUMMARY OF THE INVENTION

The present invention is directed to a solid-state read-only memory device that may be connected to a computer system via a serial connection, such as a Universal Serial Bus or 1394 connection, and that does not require a special driver. When it is initialized as part of initializing the devices on the serial connection during the operating system's boot process, the memory device inaccurately identifies itself as a storage device of a type known to the operating system, such as a hard drive. The contents of the memory device can then be read using portions of the operating system designed and provided for reading from storage devices of the identified type.

Such a memory device has several useful applications. First, it can be used alone as a fast form of storage, having both a small latency time and a large transfer rate. Such use is well-suited to video game cartridges, such as those used with popular video game console systems. Second, the memory device can be incorporated in another device. For example, such a memory device containing a driving video game may be incorporated in a steering wheel game controller. As a further example, such a memory device can be incorporated in a peripheral device, such as a printer or a scanner. Such a memory device may contain a driver for the peripheral device. When the serial connection is initialized, the memory device inaccurately identifies itself as a hard drive, and the peripheral device correctly identifies itself by its peripheral device type. If the correct driver for the identified device type is not already available computer system, the computer system searches all available storage devices, including the memory device of the invention, where it finds the correct driver for the peripheral device. The computer system can then install this driver, and proceed to use the new peripheral device without requiring the correct driver to be provided manually. Instead of the driver or in addition to the driver, the memory device may contain additional programs, such as application programs that utilize the peripheral device. By integrating the memory device into the additional device, it can be guaranteed that the data stored in the memory device is always available in conjunction with the additional device. Finally, the solid-state memory device may be combined with a storage device having different characteristics, such as a CD-ROM drive with media. Such a combination may be used with applications that have different retrieval performance requirements for different portions of their data. As an example, a game may include executable code, which must be loaded quickly, and video data, which can be loaded more slowly. In accordance with such requirements, the executable code could be stored in the faster solid-state memory device, while the video data could be stored on the cheaper CD-ROM.

DETAILED DESCRIPTION OF THE INVENTION

The present invention is directed to a solid-state read-only memory device that may be connected to a computer system via a serial connection, such as a Universal Serial Bus or 1394 connection, and that does not require a special driver. When it is initialized as part of initializing the devices on the serial connection during the operating system's boot process, the memory device inaccurately identifies itself as a storage device of a type known to the operating system, such as a hard drive. The contents of the memory device can then be read using portions of the operating system designed and provided for reading from storage devices of the identified type.

Such a memory device has several useful applications. First, it can be used alone as a fast form of storage, having both a small latency time and a large transfer rate. Such use is well-suited to video game cartridges, such as those used with popular video game console systems. Second, the memory device can be incorporated in another device. For example, such a memory device containing a driving video game may be incorporated in a steering wheel game controller. As a further example, such a memory device can be incorporated in a peripheral device, such as a printer or a scanner. Such a memory device may contain a driver for the peripheral device. When the serial connection is initialized, the memory device inaccurately identifies itself as a hard drive, and the peripheral device correctly identifies itself by its peripheral device type. If the correct driver for the identified device type is not already available computer system, the computer system searches all available storage devices, including the memory device of the invention, where it finds the correct driver for the peripheral device. The computer system can then install this driver, and proceed to use the new peripheral device without requiring the correct driver to be provided manually. Instead of the driver or in addition to the driver, the memory device may contain additional programs, such as application programs that utilize the peripheral device. By integrating the memory device into the additional device, it can be guaranteed that the data stored in the memory device is always available in conjunction with the additional device. Finally, the solid-state memory device may be combined with a storage device having different characteristics, such as a CD-ROM drive with media. Such a combination may be used with applications that have different retrieval performance requirements for different portions of their data. As an example, a game may include executable code, which must be loaded quickly, and video data, which can be loaded more slowly. In accordance with such requirements, the executable code could be stored in the faster solid-state memory device, while the video data could be stored on the cheaper CD-ROM.

Figure 1:
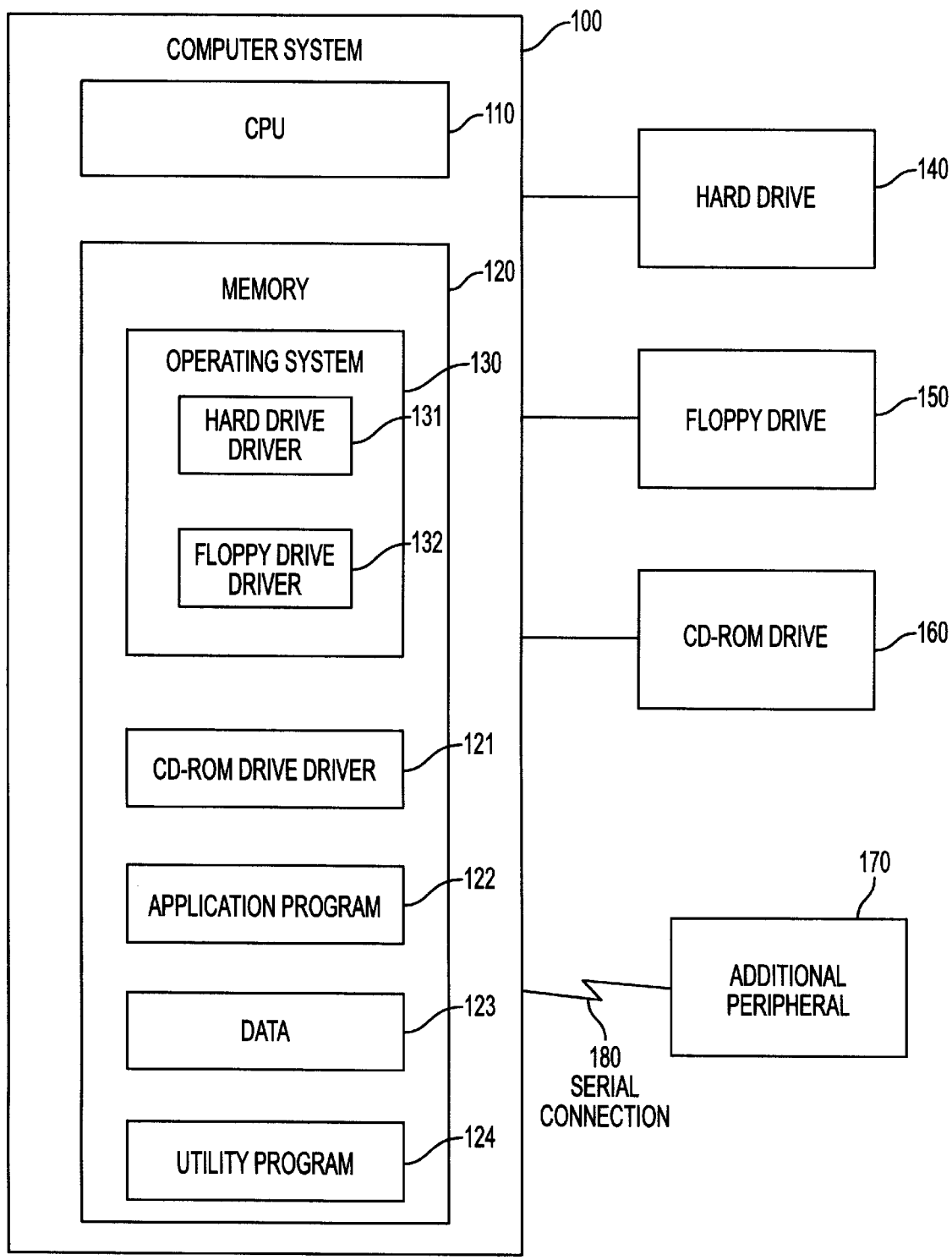
FIG. 1 is a high-level block diagram of the general-purpose computer system to which the solid-state memory device is preferably connected.

FIG. 1 is a high-level block diagram of the general-purpose computer system to which the solid-state memory device is preferably connected. The computer system 100, or "data processing system," contains a central processing unit (CPU) 110 and a computer memory (memory) 120. The computer system 100 is further connected to input/output devices, including a storage device 140, such as a hard disk drive; a floppy drive 150; a CD-ROM drive 160; and an additional peripheral device 170 containing the solid-state memory device, and optionally a related traditional peripheral device. The additional peripheral 170 is preferably connected to the computer system 100 by a serial connection 180, and may share this serial connection with other peripheral devices (not shown). The memory 130 preferably contains an operating system 130, such as Microsoft® Windows® 98. The operating system 130, in turn, includes a driver 131 for hard drives, and a driver 132 for floppy drives, which enable the operating system to access hard drives and floppy drives without installing additional drivers. The memory 120 further preferably contains a driver 121 for CD-ROM drives, an application program 122, data 123 corresponding to the application program, and a utility program 124. The memory 120 may also contain additional data not shown. While the solid-state memory device is preferably connected to a computer system configured as described above, those skilled in the art will recognize that it may also be connected to computer systems having different configurations.

Figure 2:
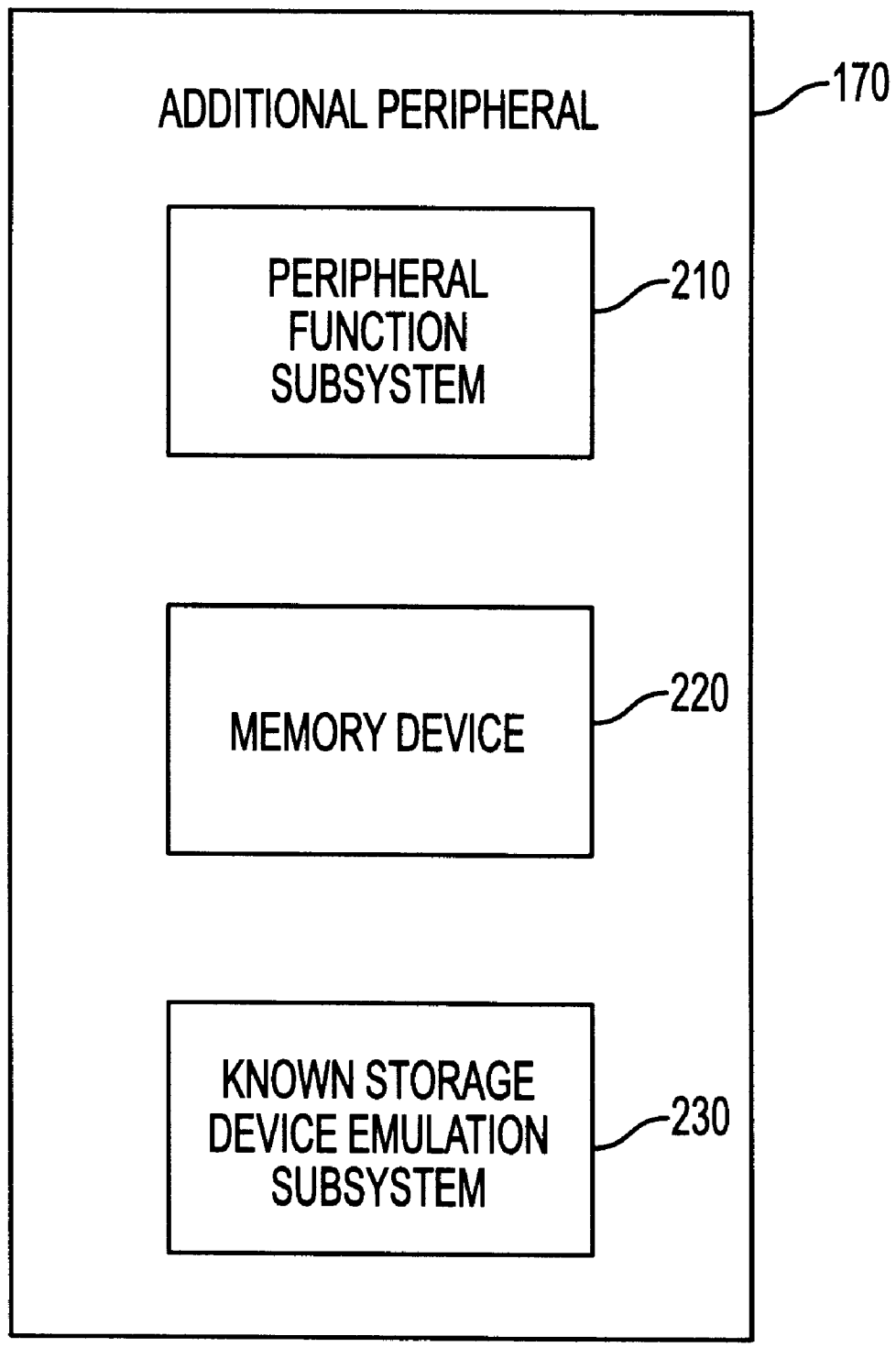
FIG. 2 is a block diagram showing the functional components for the additional peripheral shown in FIG. 1 for the embodiment providing the memory device in conjunction with another peripheral.

FIG. 2 is a block diagram showing the functional components for the additional peripheral shown in FIG. 1 for the embodiment providing the memory device in conjunction with another peripheral. In several embodiments, these functional components are all provided in the same case or package, such that they are generally inseparable. In these embodiments, the functional components generally remain in this case or package. The additional peripheral 170 preferably includes a peripheral function subsystem 210, a memory device 220, and a known storage device emulation subsystem 230. The peripheral function subsystem is the portion of the additional peripheral that provides typical peripheral functionality. For example, it may be a CD-ROM drive that reads CD-ROMs, a printer that prints documents, an optical scanner that reads documents, a modem that connects the computer system to another computer system via phone lines, a joystick or other game controller that a user may use to provide input to an entertainment software title, a DVD RAM drive that may used to read or write DVDs, etc. The foregoing list is merely illustrative, as the peripheral function subsystem can perform the function of any traditional peripheral device, whether now known or later developed.

A persistent memory device 220 contains data relating to the peripheral function subsystem. For example, the memory device may contain a driver for the peripheral function subsystem. The memory device may further contain any other program or programs relating to the peripheral function subsystem, such as application or utility programs executed in connection with the peripheral function subsystem. For example, the memory device may contain a document scanning application executed in conjunction with an optical scanner peripheral function subsystem. As another example, the memory device may contain a file backup utility program executed in conjunction with a sequential tape drive. As a further example, the memory device may include an entertainment software title that uses a game controller peripheral function subsystem to provide input for the entertainment title. To better facilitate the command translation function of the known storage device emulation subsystem 230, the driver and other files stored in the memory device 220 are preferably stored in a manner that is similar, if not identical, to the format in which they would be stored on a hard drive.

The known storage device emulation subsystem 230 contains logic that misrepresents the memory device 220 as a hard disk drive, or as a device of another type known to the operating system. Because the operating system understands the memory device 220 to be a hard disk drive, or a device of another type known to it, the operating system is not prompted to search for and install a driver for the memory device—rather it registers the memory device as a hard drive or other known device in its drive letter table, and expects that it may access the memory device by issuing commands within the command set for a hard drive or other known device. If, on the other hand, the known device emulation system did not misrepresent the identity of the memory device, the operating system would have to obtain and install a special driver in order to read from the memory device. When the operating system subsequently receives commands from the hard drive command set, they are intercepted by the known storage device emulation subsystem, which translates them for execution by the memory device.

Because the memory device is preferably read-only, the principal hard drive commands to which it must respond under the control of the known storage device emulation subsystem are commands for reading data. These are detailed, for example, in the Small Computer System Interface-2 ("SCSI-2") proposed standard, which is available from the International Standards Organization under Reference No. 9316-1. It will be appreciated by those skilled in the art, however, that any standard for communication between a computer system and a hard drive or other device known to the operating system may be used to derive the hard drive command set to which the known storage device emulation subsystem should respond appropriately. In the example of the SCSI-2 standard, the memory device must respond to commands to read from the hard drive, such as READ(6) (operation code 08h) and READ(10) (operation code 28h). In response to these read commands, the memory device must locate in the memory device the specified data and return it to the operating system. The memory device must also respond appropriately to other commands defined by the standard for hard drives. For instance, in response to commands to format the hard drive (e.g., FORMAT UNIT (operation code 3Ah)), or to write to the hard drive (e.g., WRITE(6) (operation code 0Ah)), WRITE(10) (operation code 2Ah), WRITE AND VERIFY (operation code 2Eh), WRITE BUFFER (operation code 3Bh), WRITE LONG (operation code 3Fh), WRITE SAME (operation code 41h), the memory device must return an error message to the effect that these commands cannot be performed by the memory device. The memory device similarly responds to other commands defined for the hard drive as is appropriate. All of these responses are preferably handled by the known storage device emulation subsystem 230.

The memory device 220 is preferably a solid-state silicon read-only memory device, but may be implemented using other technologies as prevailing device price and performance conditions militate. The known storage device emulation subsystem 230 is preferably an application specific integrated circuit, a programmable logic array, or a microcontroller or microprocessor coupled with a control ROM. Alternative technologies may be substituted as prevailing device price and performance conditions militate.

In one embodiment, the memory device 220 and the known storage device emulation subsystem 230 are combined in a device such as an application specific integrated circuit, a programmable logical array, or a microcontroller or a microprocessor coupled with a controller/data ROM.

Figure 3:
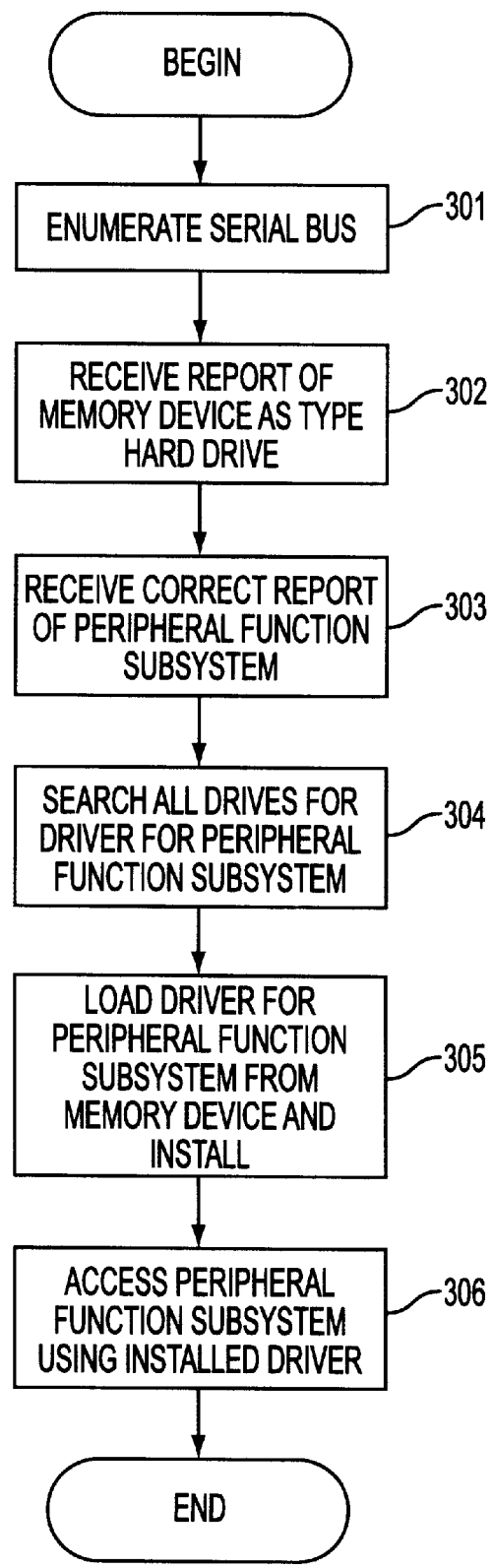
FIG. 3 is a flow diagram that shows the steps preferably performed by the operating system in order to utilize an additional peripheral that includes a peripheral function subsystem and an associated driver.

FIG. 3 is a flow diagram that shows the steps preferably performed by the operating system in order to utilize an additional peripheral that includes a peripheral function subsystem and an associated driver. While these steps are preferably performed during the operating system's startup process, they may also or instead be performed at a later time. In step 301, the operating system enumerates the serial bus. That is, the operating system requests a report of the identities of all the devices connected to the serial bus. While such enumeration reporting is well known to those skilled in the art, details of this process may be found, for example, in the Universal Serial Bus specification, Revision 1.0, Jan. 15, 1996, presently available at http://www.teleport.com/~USB. In response to the enumeration request of step 301, the operating system receives a report of the memory device 220. The report inaccurately indicates that the memory device is of the hard drive device type. Alternatively, the operating system may receive a report that indicates that the memory device is of another device type that can be accessed by the operating system without an additional driver, or is "known" to the operating system.

In step 303, also in response to the enumeration request of step 301, the operating system receives a correct report of the identity of the peripheral function subsystem. That is, where the peripheral function subsystem is an optical scanner, the report received in step 303 indicates that the peripheral function subsystem is an optical scanner. In step 304, because a driver must be found and installed for the peripheral function subsystem to make the peripheral function subsystem usable, the operating system searches all available drives for a driver for the peripheral function subsystem. This list preferably includes drives such as a CD-ROM drive, a floppy drive, and hard drives including the memory device 220. In step 305, the operating system finds the driver stored in the memory device, loads this driver from the memory device, and installs it. Following this installation process, the operating system can communicate with the peripheral function subsystem using the driver. For example, in step 306, the operating system accesses the peripheral function subsystem using the installed driver. These steps then conclude. Thus, the invention provides a new peripheral (the peripheral function subsystem) that does not require the provision of a separate driver.

In additional embodiments of the invention, rather than containing a driver, the memory device 220 contains other programs relating to the peripheral function subsystem, such as application or utility programs. These programs can be loaded from the memory device 220 in a similar manner and executed on the CPU 110. Thus, the invention provides a peripheral device that integrally provides a program relating to the peripheral device.

Figure 4:
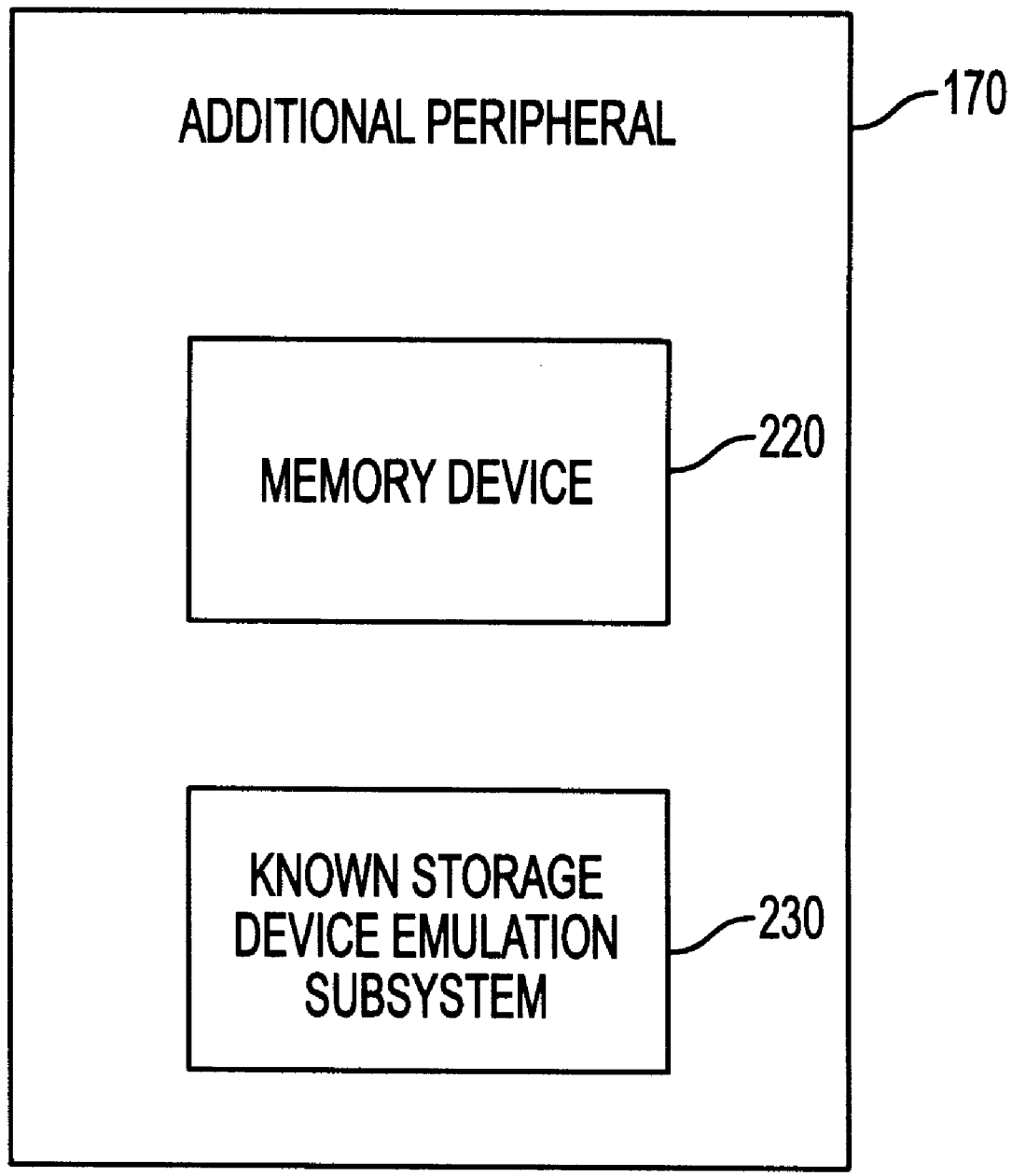
FIG. 4 is a block diagram showing the functional components of the additional peripheral shown in FIG. 1 for the serial ROM embodiment.

The present invention also provides a serial ROM additional peripheral. This embodiment can be used to store any program that benefits from quick retrieval, such as a game program. FIG. 4 is a block diagram showing the functional components of the additional peripheral shown in FIG. 1 for the serial ROM embodiment. In this embodiment, the additional peripheral 170 contains only the memory device 220 and the known storage device emulation subsystem 230. The memory device 220 and the known storage device emulation subsystem 230 function together as described above in conjunction with FIG. 2, allowing the operating system to quickly retrieve programs stored in the memory device using commands in the hard drive command set. These two functional components may be implemented and combined in the manners discussed above in conjunction with FIG. 2.

In a further embodiment, the invention provides a speed-heterogeneous storage device. In this embodiment, the solid-state memory device 220 constitutes a fast storage medium, while the peripheral function subsystem 210 constitutes a slower, lower cost storage medium, such as a CD-ROM drive containing a permanently-installed CD-ROM. Those skilled in the art will appreciate that different medium may be readily substituted for the solid-state memory device as the fast storage medium and/or the CD-ROM drive as the slower, lower-cost storage medium. In this embodiment, transfer speed-sensitive data, such as executable code for an entertainment title, is stored in the memory device 220. Transfer speed-insensitive data, such as playable or streaming multimedia files (e.g., video clips) are preferably stored in the peripheral function subsystem 210, thereby reducing the amount of more expensive solid-state memory required in the additional peripheral 170.

While this invention has been shown and described with reference to preferred embodiments, it will be understood by those skilled in the art that various changes or modifications in form and detail may be made without departing from the scope of the invention. For example, instead of comprising a traditional peripheral device, the peripheral function subsystem may comprise devices of other types, such as conventional computer electronics devices, like televisions and cellular telephones.

We claim:

1. A peripheral device that provides its own driver and that is connectable to a computer system, comprising:
    a first subsystem for providing a peripheral device functionality other than a functionality of a storage device;
    a persistent memory device containing a driver that, when installed by the computer system, enables the computer system to interact with the peripheral device to utilize peripheral device functionality provided by the first subsystem; and
    a second subsystem, different from said first subsystem, that emulates a storage device of a type usable by the computer system without further modification and enables the computer system to install the driver contained by the persistent memory device to utilize peripheral device functionality provided by the first subsystem.

2. The peripheral device of claim 1 wherein the first subsystem includes an input device that provides functionality for inputting data into the computer system.

3. The peripheral device of claim 2 wherein the first subsystem includes a joystick.

4. The peripheral device of claim 2 wherein the first subsystem includes a digital video disk drive.

5. The peripheral device of claim 1 wherein the first subsystem includes an output device that provides functionality for outputting data from the computer system.

6. The peripheral device of claim 5 wherein the first subsystem includes a printer.

7. The peripheral device of claim 1 wherein the first subsystem includes and input/output device that provides functionality for inputting data into and outputting data from the computer system.

8. The peripheral device of claim 7 wherein the first subsystem includes a removable cartridge drive.

9. The peripheral device of claim 7 wherein the first subsystem includes a modem.

10. The peripheral device of claim 1 wherein the first subsystem includes a consumer electronics device.

11. The peripheral device of claim 10 wherein the first subsystem comprises a television.

12. The peripheral device of claim 1 wherein both the persistent memory device and the second subsystem are provided in a single application-specific integrated circuit.

13. The peripheral device of claim 1 wherein the persistent memory device is provided in a solid state read-only memory device, and wherein the second subsystem is provided in an application specific integrated circuit connected to the solid state read-only memory device.

14. A peripheral device that provides its own driver and that is connectable to a computer system, comprising:
    a first subsystem for providing a first functionality of the device, wherein the first functionality is other than a functionality of a storage device;
    a persistent memory device containing a data file that, after installation by the computer system, enables the computer system to interact with the peripheral device to utilize the first functionality of the device; and
    a second subsystem, different from said first subsystem, for providing a second functionality of the device until the computer system installs the driver contained by the persistent memory device to utilize the first functionality of the device, wherein the second functionality comprises emulating a storage device of a type usable by the computer system without further modification so that the computer system can retrieve and install the data file.

15. The peripheral device of claim 1, wherein the persistent memory device comprises a solid state memory device.

16. The peripheral device of claim 15, wherein the solid state memory device also contains an application program that utilizes the first subsystem of the peripheral device.

17. The peripheral device of claim 15, wherein the solid state memory device also contains a utility program that utilizes the first subsystem of the peripheral device.

18. The peripheral device of claim 15, wherein the first subsystem comprises an optical scanner, and wherein the solid state memory device also contains a program for optically scanning an image to create a representation of the image in the computer system.

19. The peripheral device of claim 15, wherein the first subsystem comprises a game controller, and wherein the solid state memory device stores a game program that utilizes the game controller.

20. A computer-assisted method for installing software relating to a peripheral device, where the software is provided integrally to the peripheral device, comprising:
    (a) recognizing a first subsystem of the peripheral device, wherein the first subsystem emulates a persistent memory device as a known storage device of a type usable without further modification by a computer system to which the peripheral device is attached; and (b) installing on the computer system a data file stored on the persistent memory device, enabling the computer system to utilize a peripheral device functionality, other than a storage device functionality, provided by a second subsystem of the peripheral device, different from said first subsystem of the peripheral device.

21. The method of claim 20, further comprising the computer system interacting with the peripheral device under control of the installed data file.

22. The method of claim 20, further comprising initiating the recognizing and installing steps automatically under sole control of the computer system.

23. The method of claim 22, wherein the computer system performs the initiating step during a startup process.

24. The method of claim 20, wherein installing comprises reading data from the persistent memory device using only commands of the computer system used to read data from a disk drive.

25. The method of claim 20, wherein installing comprises reading data from the persistent memory device using a driver used by the computer system to read data from a disk drive.

* * * * *

UNITED STATES PATENT AND TRADEMARK OFFICE
CERTIFICATE OF CORRECTION

PATENT NO. : 6,574,588 B1
DATED : June 3, 2003
INVENTOR(S) : Daniel Shapiro et al.

It is certified that error appears in the above-identified patent and that said Letters Patent is hereby corrected as shown below:

<u>Title page,</u>
Item [56], References Cited, U.S. PATENT DOCUMENTS, "5,491,816" has been replaced with -- 5,491,813 --.

<u>Column 1,</u>
Lines 19, 32, 62 and 67, "modem" has been replaced with -- modern --.

Signed and Sealed this

Second Day of March, 2004

JON W. DUDAS
*Acting Director of the United States Patent and Trademark Office*